(12) United States Patent
Hartnett et al.

(10) Patent No.: US 9,408,422 B2
(45) Date of Patent: Aug. 9, 2016

(54) ILLUMINATED GARMENT SYSTEM AND METHOD OF USING THE SAME

(71) Applicant: Big Skeleton, Inc., Las Vegas, NV (US)

(72) Inventors: Andrew G. Hartnett, Las Vegas, NV (US); Emily K. Hartnett, Las Vegas, NV (US)

(*) Notice: Subject to any disclaimer, the term of this patent is extended or adjusted under 35 U.S.C. 154(b) by 0 days.

(21) Appl. No.: 14/851,095

(22) Filed: Sep. 11, 2015

(65) Prior Publication Data

US 2016/0073706 A1 Mar. 17, 2016

Related U.S. Application Data

(60) Provisional application No. 62/071,098, filed on Sep. 15, 2014.

(51) Int. Cl.
| | |
|---|---|
| *F21V 21/108* | (2006.01) |
| *A41D 13/01* | (2006.01) |
| *H05B 33/08* | (2006.01) |
| *B60Q 1/00* | (2006.01) |
| *B62J 35/00* | (2006.01) |

(52) U.S. Cl.
CPC *A41D 13/01* (2013.01); *B60Q 1/00* (2013.01); *B62J 35/00* (2013.01); *H05B 33/0854* (2013.01); *H05B 33/0872* (2013.01); *A41D 2600/102* (2013.01); *A41D 2600/104* (2013.01)

(58) Field of Classification Search
CPC .................................................. A41D 1/04
USPC .................................................. 362/103, 108
See application file for complete search history.

(56) References Cited

U.S. PATENT DOCUMENTS

| | | | | |
|---|---|---|---|---|
| 2004/0260470 | A1* | 12/2004 | Rast ........ | G06Q 10/06 701/300 |
| 2008/0089056 | A1* | 4/2008 | Grosjean ...... | B60Q 1/2673 362/103 |
| 2010/0124049 | A1* | 5/2010 | Fabian ...... | A41D 13/01 362/108 |

* cited by examiner

*Primary Examiner* — Thuy Vinh Tran
(74) *Attorney, Agent, or Firm* — Greenberg Traurig, LLP

(57) ABSTRACT

A garment (e.g., vest) designed to be worn over a motorcyclist's outer clothing with high intensity LED lighting installed on front and rear surfaces thereof and motion-sensing circuitry and corresponding software that detects motorcycle deceleration and controls the sequence, color and/or intensity of the LED lighting. A small, light battery pack installed in the garment powers the system. The motion-sensing circuitry and software detects that the motorcycle is decelerating when the driver releases or reduces the throttle, downshifts and/or applies the brakes. Responsive to the driver releasing or reducing the throttle, downshifting, applying the brakes and/or riding on upward-directed terrain, the electronics and software change the color output of LEDs on the rear surface of the garment to red. The electronics of the garment are sealed in watertight assemblies.

20 Claims, 3 Drawing Sheets

ILLUMINATED GARMENT SYSTEM AND METHOD OF USING THE SAME

CROSS-REFERENCE

This application claims priority to U.S. application Ser. No. 62/071,098 filed on Sep. 15, 2014 and which is incorporated herein for any and all purposes.

FIELD OF THE INVENTION

The embodiments of the present invention relate to an illuminated garment system for riders of motorcycles or bicycles to better notify traffic of deceleration thereof.

BACKGROUND

Motorcycles are often not seen by other drivers because motorcycles provide a small visual target such that they are easily overlooked on busy roads. Moreover, motorcycles are capable of more rapid braking deceleration than other vehicles but such use activates brake lights. They can also achieve rapid deceleration by releasing the throttle or down shifting which eliminates the visual cue of the illuminated brake lights. The latter two challenges make the motorcyclist highly vulnerable to accidents with other vehicles and drive the need for an effective means of increasing the motorcyclist's visibility and for signaling deceleration.

Various methods have been attempted to make the motorcyclist more visible including the use of illuminated clothing. Some illuminated clothes are heavy and bulky and/or plugged into the motorcycle's electrical system. Still others have their own battery pack. For one reason or another, illuminated clothing has not become popular with the motorcycling public.

Thus, it would be advantageous to develop a stylish, lightweight, highly-visible garment that not only makes the motorcyclist more visible but also warns of a decelerating motorcycle regardless of the means of deceleration.

SUMMARY

The embodiments of the present invention comprise a garment (e.g., vest) designed to be worn over a motorcyclist's outer clothing with high intensity LED lighting installed on front and rear surfaces thereof and motion-sensing circuitry and corresponding software that detects motorcycle deceleration and controls the sequence, color and/or intensity of the LED lighting. A small, light battery pack installed in the garment powers the system. In one embodiment, the software of the present invention illuminates the LEDs using a repeating or random pattern. The motion-sensing circuitry and software detects that the motorcycle is decelerating when the driver releases or reduces the throttle, downshifts and/or applies the brakes. Responsive to the driver releasing or reducing the throttle, downshifting and/or applying the brakes, the electronics and software change the color output of LEDs on the rear surface of the garment to red. In one embodiment, the electronics of the garment are sealed in watertight assemblies.

Other variations, embodiments and features of the present invention will become evident from the following detailed description, drawings and claims.

DETAILED DESCRIPTION

Figure 1:
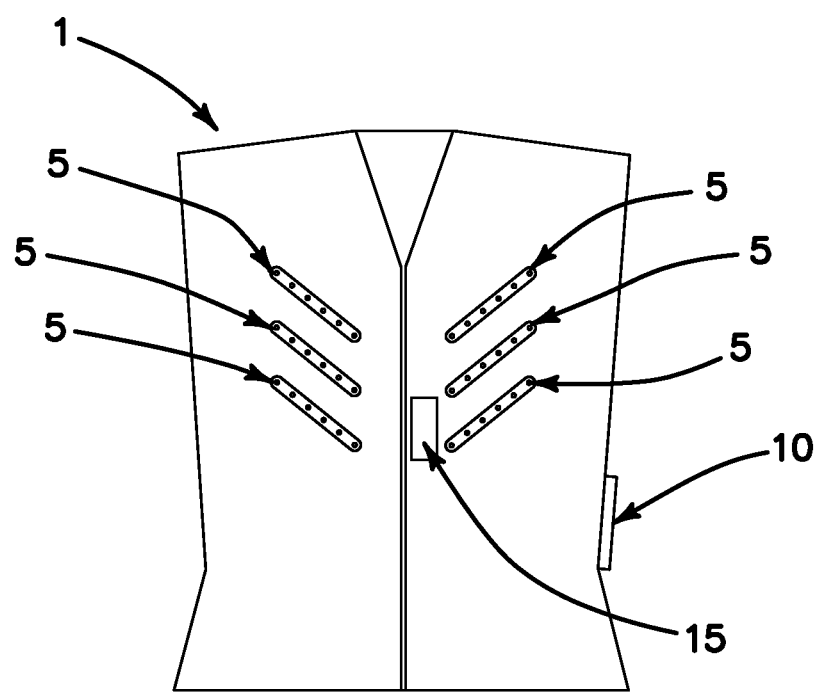
FIG. 1 illustrates a front view of an illuminated vest showing a front LED array, microprocessors and motion-sensing circuitry, and battery and charge management assembly according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and/or software elements which portions are described below in such detail required to construct and operate the method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages.

Aspects of the present invention are described below with reference to flowchart illustrations and/or block diagrams of methods, apparatus (systems) and computer program products according to embodiments of the invention. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

Figure 2:
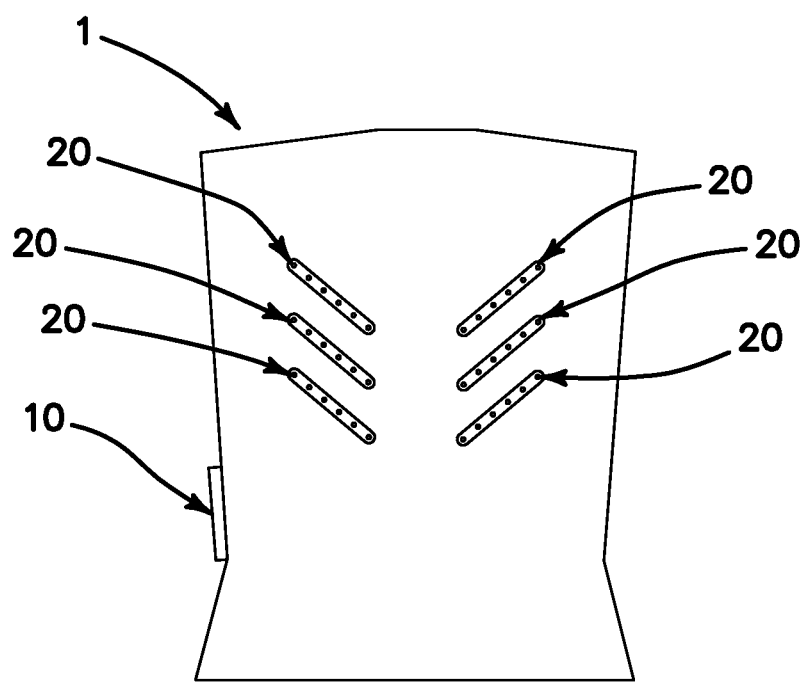
FIG. 2 illustrates a rear view of the illuminated vest showing a rear LED array according to the embodiments of the present invention.
Figure 3:
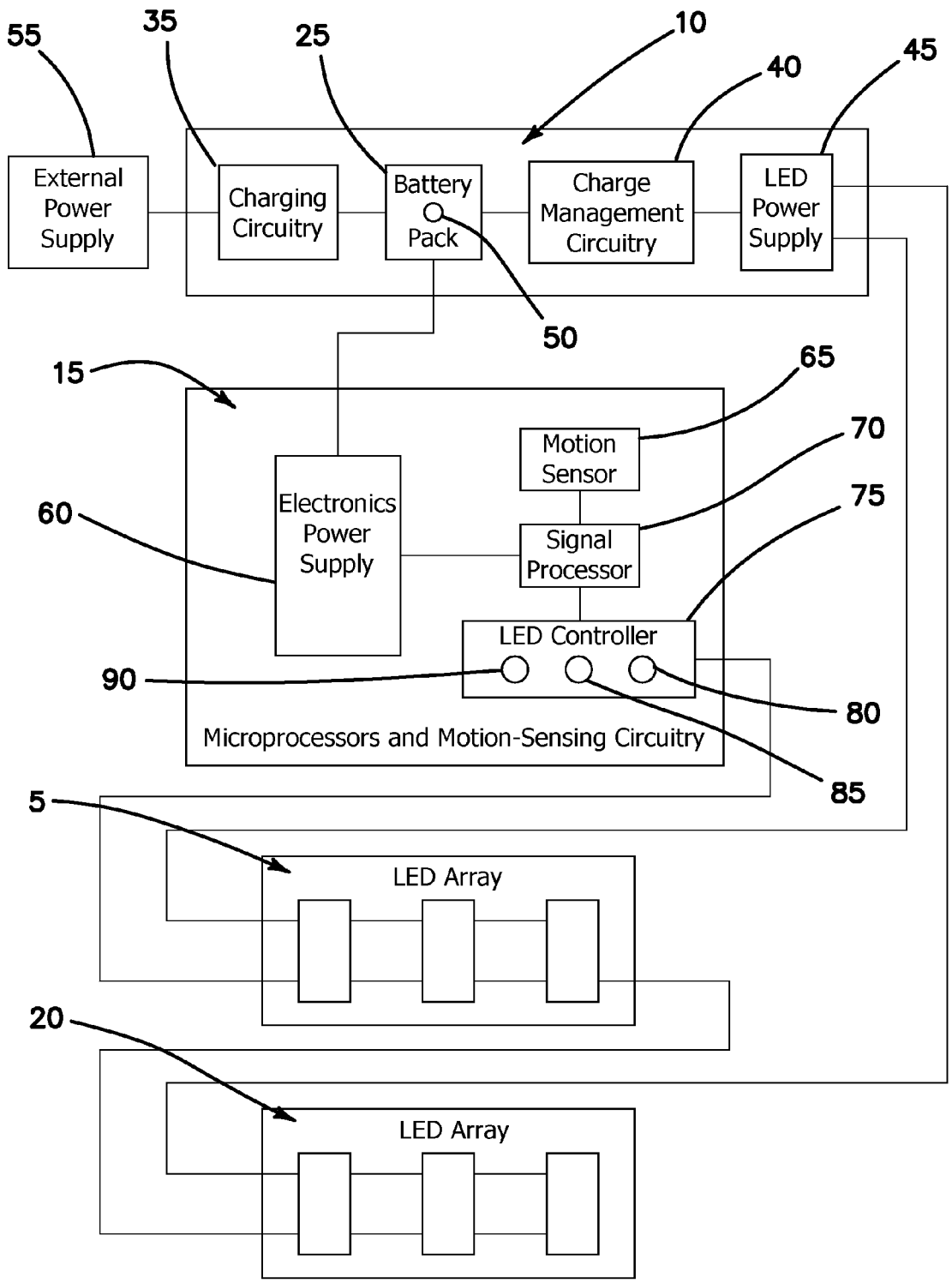
FIG. 3 illustrates a block diagram of the electronic circuitry according to the embodiments of the present invention.

FIG. 1 shows the front surface of a garment in the form of a vest 1 including front LED strips/arrays 5, battery and charge management circuitry assembly 10 and microprocessors and motion-sensing circuitry 15. FIG. 2 shows the back surface of vest 1 including rear LED strips/arrays 20 and battery and charge management circuitry assembly 10. The electronics of the system are contained in weather-proof assemblies and the electrical connections are weather proof. LED arrays 5 and 20, battery and charge management circuitry assembly 10, microprocessors and motion-sensing circuitry 15 as well as the electrical wiring (not shown) are detachable from the vest 1 to allow for cleaning of the same. In one embodiment, hook and loop fasteners are used to attach the components to the garment but any fasteners allowing removal of the components may be used. Alternatively, the components may be integral with the garment such they are not easily removed. As used herein, a "garment" should be understood to be any article (e.g., short, jacket, sweater, etc.) wearable by a user. The position and arrangement of the components on the vest 1, may be modified without departing from the sprit and scope of the embodiments of the present invention.

In one embodiment, the battery and charge management circuitry assembly 10 comprises a battery pack 25, charging circuitry 35, charge management circuitry 40, LED power supply 45 and on/off switch 50. The battery pack 25 may be a rechargeable lithium ion, 7.4 volt UN rated battery. Those skilled in the art will recognize that other batteries may power the system detailed herein.

Charging circuitry 35 allows the system to be connected to external power supply 55 and configured to detect the battery voltage. If the battery voltage is below a predefined limit and external power supply 55 is connected, charging circuitry 35 executes a constant current/constant voltage-charging algorithm appropriate for a lithium ion battery regardless of whether the LED circuitry is switched on or off via on/off switch 50. Charging circuitry 35 determines when battery pack 25 is fully charged and discontinues charging thereafter. On/off switch 50 controls power to charge management circuitry 40, LED power supply 45 and/or microprocessors and motion-sensing circuitry 15.

Charge management circuitry 40 monitors the battery pack 25 voltage during usage and provides a visual indication of current battery charge by illuminating a low battery indicator LED (not shown) when charge management circuitry 40 detects battery pack 25 voltage has dropped below a predefined minimum. LED power supply 45 regulates the battery voltage to provide a constant voltage to LED arrays 5 and 20.

Microprocessor and motion-sensing circuitry assembly 15 contains electronics power supply 60, motion sensor 65, signal processor 70, LED controller 75, intensity selector 80, pattern display selector 85 and color selector 90. Electronics power supply 60 converts the voltage from battery pack 25 to the appropriate voltages and supplies the power to motion sensor 65, signal processor 70 and LED controller 75.

In one embodiment, motion sensor 65 is a programmable InvenSense 6500 or similar programmable sensor that monitors the movement of the wearer of the vest 1 and detects linear acceleration and deceleration in x, y and z axes and detects angular rate of rotation around each of the x, y and z axes. Motion sensor 65 also processes the acceleration/deceleration and rotation signals and provides data to signal processor 70. Other motion sensors and more than one motion sensor may be used as well.

In one embodiment, signal processor 70 is a programmable Atmel ATmega 1284 or similar programmable processor that reads the data from motion sensor 65. If signal processor 70 determines from the read data that a deceleration is occurring, the signal processor 70 transmits a signal to LED controller 75.

In one embodiment, LED controller 75 is a programmable Atmel AT Mega 32U4 or similar programmable processor that monitors the signal from signal processor 70 and transmits a signal to LED arrays 5 and 20. In one embodiment, the individual LEDs of LED arrays 5 and 20 are WS2812B RGB (red, green and blue) LEDs or similar LEDs with built in drivers that drive the individual red, green or blue diodes of each RGB LED based on data received from LED controller 75. If the signal from signal processor 70 indicates no deceleration is occurring, LED controller 75 continually loops the selected display pattern through LED arrays 5 and 20. The color and pattern configuration of LED arrays 5 and 20 are wearer selected and can be (i) a flashing or steady unchanging array; (ii) a flashing or steady program sequenced changing color array or (iii) a flashing or steady random color array. Various patterns may be stored in memory for access when needed. In one embodiment, each of the LEDs i s capable of displaying multiple colors. Besides LEDS, other illumination devices may be used.

The light intensity of the LED arrays 5 and 20 can be regulated by the wearer by pressing intensity selector switch 80. Repeated pressing of the intensity selector switch 80 increases the LED light intensity until a peak intensity is reached. Pressing the light intensity switch 80 again repeats the process starting with the lowest light intensity and progressing to the peak intensity.

The color and pattern configuration of LED arrays 5 and 20 can be selected by the wearer pressing pattern display selector 85 and color selector 90. Pressing pattern display selector 85 causes the pattern to cycle to the next available light pattern. Pressing color selector 90 causes the selected pattern to cycle to the next available color. The selected light pattern remains on until pattern display selector 85 is pressed again. The selected color remains on until color selector 90 is pressed again. If power is removed from vest 1, the previously selected display pattern and color resume when power to vest 1 is restored.

If signal processor 70 determines from data received from motion sensor 65 that deceleration is occurring, signal processor 70 transmits a signal to LED controller 75, which transmits a signal to LED array 20 on the rear surface of vest 1 causing the LED array 20 to revert to the "all red" state until such a time as signal processor 70 determines that the deceleration has ended. Such deceleration may be the result letting off the throttle, braking, downshifting and/or riding on upward-directed terrain. Once signal processor 70 determines that deceleration has ended, LED controller 75 resumes looping through the selected display pattern.

Figure 4:
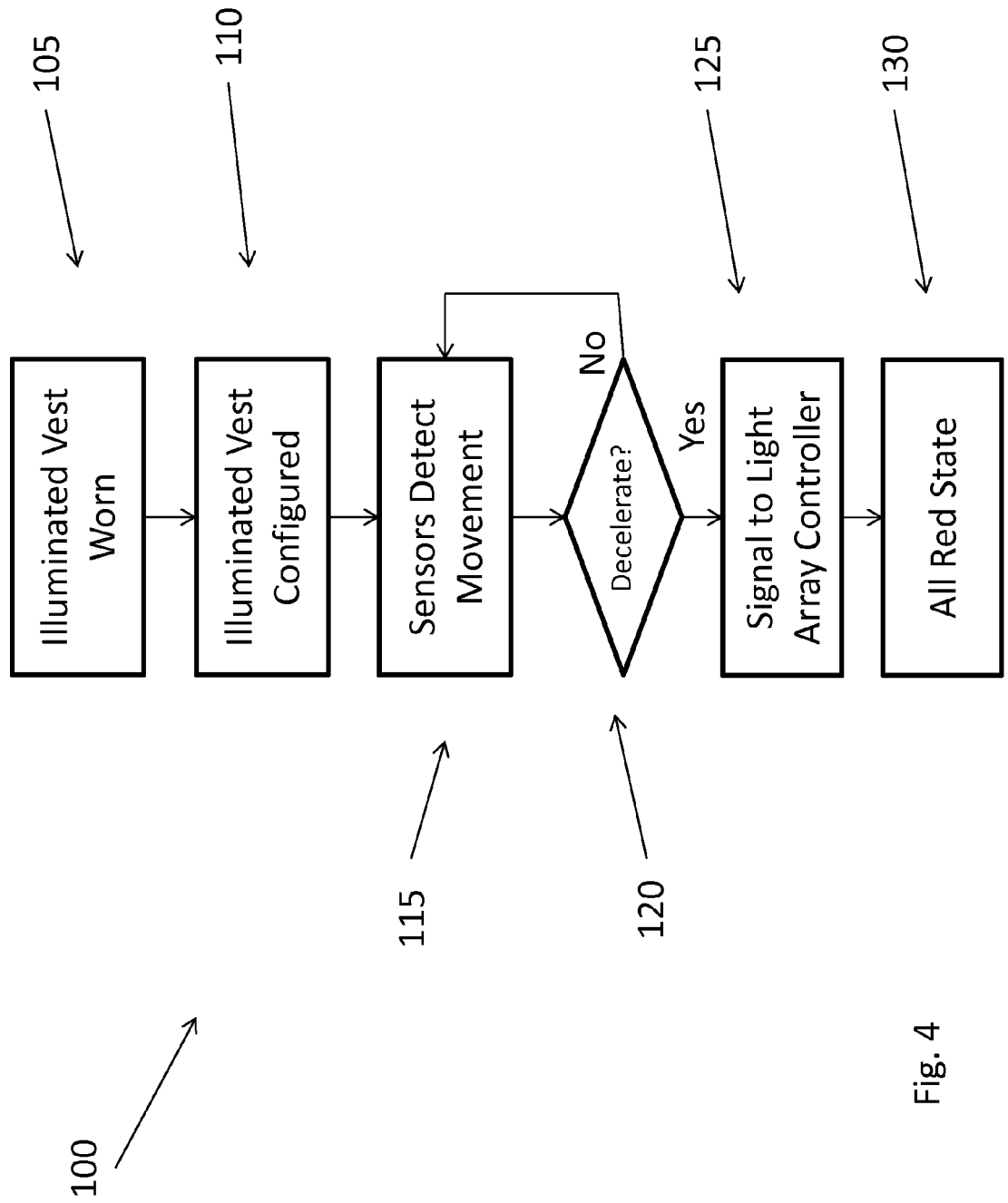
FIG. 4 illustrates a flow chart detailing one methodology of operating said vest according to the embodiments of the present invention.

FIG. 4 illustrates a flow chart 100 detailing one methodology of operating said vest 1 according to the embodiments of the present invention. At 105, the illuminated vest 1 is worn. At 110, the vest 1 is configured as detailed above. At 115, one or more motion sensors detect movement of said garment. At 120, it is determined if deceleration has been detected. If not, the flowchart 100 loops back to 115. If so, at 125, a signal is transmitted to a light array controller. At 130, responsive to receipt of said signal, said light array controller triggers one or more light arrays to illuminate in all red state notifying other traffic that said motorcycle or bicycle is decelerating.

While a motorcycle is used herein to describe the embodiments of the present invention, it is understood that motorcycle includes scooters, mopeds, three-wheeled vehicles (e.g., Trike) and four-wheeled vehicles (e.g., ATV). In addition, the garment system is also suitable for unpowered vehicles such as bicycles.

Although the invention has been described in detail with reference to several embodiments, additional variations and modifications exist within the scope and spirit of the invention as described and defined in the following claims.

We claim:

1. A garment comprising:
   one or more light arrays on at least a rear of said garment;
   one or more motion sensors configured to monitor movements of said garment on a motorcycle or bicycle;
   a signal processor configured to manage data from said one or more sensors;
   a light array controller configured to transmit control signals to said one or more light arrays responsive to signals from said processor;
   a power supply configured to power said one or more light arrays, said one or more sensors, said signal processor and said light array controller; and
   wherein said processor is configured to transmit a deceleration signal to said light array controller responsive to said one or more motion sensors sensing a deceleration of said motorcycle or bicycle and wherein said light array controller is configured to instruct said one or more light arrays to illuminate in an all red state notifying other traffic that said motorcycle or bicycle is decelerating.

2. The garment of claim 1 wherein said garment is a vest.

3. The garment of claim 1 wherein said light array is formed of LEDs.

4. The garment of claim 1 further comprising one or more of the following:
   intensity selector;
   pattern display selector; and
   color selector.

5. The garment of claim 1 wherein said one or more sensors monitor movement of the garment in three dimensions, including angular movement.

6. The garment of claim 1 further comprising a light array on a front surface of said garment.

7. The garment of claim 1 wherein said one or more motion sensors, said signal processor, said light array controller and said power supply are contained in water tight assemblies.

8. A system comprising:
   a garment;
   one or more light arrays attachable to said garment;
   one or more motion sensors configured to monitor movements of said garment on a motorcycle or bicycle, said one or more sensors attachable to said garment;
   a signal processor configured to manage data from said one or more sensors, said signal processor attachable to said garment;
   a light array controller configured to transmit control signals to said one or more light arrays responsive to signals from said signal processor, said light array controller attachable to said garment;
   a power supply configured to power said one or more light arrays, said one or more sensors, said processor and said light array controller, said power supply attachable to said garment; and
   wherein said processor is configured to transmit a deceleration signal to said light array controller responsive to said one or more motion sensors sensing a deceleration of said motorcycle or bicycle and wherein said light array controller is configured to instruct said one or more light arrays to illuminate in an all red state notifying other traffic that said motorcycle or bicycle is decelerating.

9. The system of claim 8 wherein said garment is a vest.

10. The system of claim 8 wherein said light array is formed of LEDs.

11. The system of claim 8 further comprising one or more of the following:
    intensity selector;
    pattern display selector; and
    color selector.

12. The system of claim 8 wherein said one or more sensors monitor movement of the garment in three dimensions, including angular movement.

13. The system of claim 8 further comprising a light array on a front surface of said garment.

14. The system of claim 8 wherein said one or more motion sensors, said signal processor, said light array controller and said power supply are contained in water tight assemblies.

15. A method comprising:
    configuring an illuminated garment to include at least (i) one or more light arrays on a rear of said garment; (ii) one or more motion sensors; (iii) a signal processor configured to manage data from said one or more sensors and (iv) a light array controller configured to transmit control signals to said one or more light arrays responsive to signals from said signal processor;
    via said one or more motion sensors, sensing movement of said garment when worn by a user riding a motorcycle or bicycle; and
    responsive to said signal processor receiving data from said one or more motion sensors indicating said motorcycle or bicycle is decelerating, transmitting said data to said light array controller thereby triggering said one or more light arrays to illuminate in all red state notifying other traffic that said motorcycle or bicycle is decelerating.

16. The method of claim 15 further comprising configuring said illuminated garment to include a garment in the form of a vest.

17. The method of claim 15 further comprising configuring said illuminated garment to include one or more light arrays in the form of LEDs.

18. The method of claim 15 further comprising configuring said illuminated garment to include one or more of the following:
    intensity selector;
    pattern display selector; and
    color selector.

19. The method of claim 15 further comprising configuring said illuminated garment to include one or more sensors monitoring movement of the garment in three dimensions, including angular movement.

20. The method of claim 15 further comprising configuring said illuminated garment to include a light array on a front surface of said garment.

* * * * *